United States Patent [19]

Powell

[11] 4,112,482
[45] Sep. 5, 1978

[54] NIGHT LIGHT BELT

[76] Inventor: Virgil Powell, 1111 Victoria St., Los Angeles, Calif. 90019

[21] Appl. No.: 795,067

[22] Filed: May 9, 1977

[51] Int. Cl.² ............................................. F21V 33/00
[52] U.S. Cl. ..................................... 362/108; 362/191; 362/196; 362/200; 362/201; 362/227; 362/255; 362/293; 362/341; 362/346
[58] Field of Search ................. 240/6.4 W, 59, 103 R, 240/103 A, 103 B, 10.6 R, 10.6 CH, 10.6 SD, 10.65; 362/108, 191, 196, 200, 201, 227, 255, 293, 341, 346

[56] References Cited

U.S. PATENT DOCUMENTS

| 1,822,619 | 9/1931 | Grossman | 240/10.6 SD |
|---|---|---|---|
| 2,049,069 | 7/1936 | Martin | 240/10.6 SD |
| 2,215,829 | 9/1940 | Evans | 240/10.6 SD |
| 2,420,307 | 5/1947 | Fristoe | 240/10.6 R |
| 2,623,934 | 12/1952 | De Dow et al. | 240/10.6 R |
| 3,321,617 | 5/1967 | Santana | 240/6.4 W |
| 3,499,416 | 3/1970 | Thorsheim | 240/6.4 W |
| 3,676,664 | 7/1972 | Corvetti | 240/6.4 W |
| 3,836,759 | 9/1974 | Silverman | 240/6.4 W |
| 3,840,853 | 10/1974 | Cukale | 240/6.4 W |
| 3,944,803 | 3/1976 | Chao | 240/6.4 W |
| 3,953,722 | 4/1976 | Stick | 240/6.4 W |

Primary Examiner—Benjamin R. Padgett
Assistant Examiner—T. S. Gron
Attorney, Agent, or Firm—Koda and Androlia

[57] ABSTRACT

A safety belt of reflective material having a side coupling, is provided with red or amber colored rear lamp and a red or white front lamp that is manually removable from the belt for use as a portable flashlight which is equipped with interchangeable reflective panes on the battery and light compartments, of different colors, such as red and white.

4 Claims, 2 Drawing Figures

NIGHT LIGHT BELT

BACKGROUND OF THE INVENTION

Safety belts have been proposed having flashlights attached or built into the belt for wear about the waist of a person for night use. However, for one reason or another, such proposals have not gone into extensive use.

The main object of this invention is to provide a reflective safety belt provided with at least two flashlights, at least one of which is readily detachable from the belt for use as a portable flashlight having interchangeable panes of different colors for side-by-side battery and reflective light bulb compartments.

BRIEF SUMMARY OF THE INVENTION

A relatively wide belt composed of reflective material is provided with a rear flashlight, and a front flashlight having elongated box-like housing attached to the belt. The front flashlight is clipped to the belt for quick manual removal from the belt for use as a portable flashlight. Such flashlight is provided with a housing having a reflective lightbulb compartment and a dry battery compartment of the same size. Each compartment is covered by a flat lens or pane of reflective translucent material of different colors; and such panes are interchangeable with each other. The belt is side-coupled by a clasp type buckle, or by VELCRO material. The back of the belt is equipped with an amber colored flashlight having a switch on the belt side opposite to the end-coupling connected to the rear flashlight by wiring within the belt.

The safety belt of the invention is useful for the blind, children, and old people, as well as for bicycle and motorcycle riders at night. The lamp housing is preferably rectangular oblong boxes about six inches in length and about three inches wide, the belt being a little wider.

DETAILED DESCRIPTION OF THE INVENTION

Figure 1:
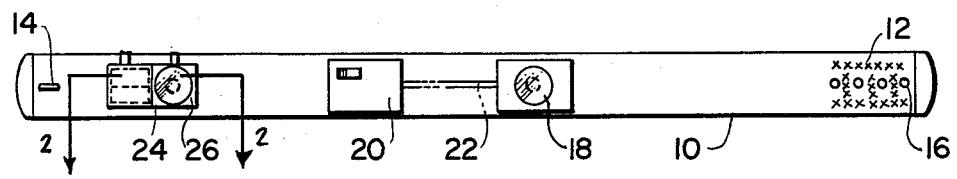
FIG. 1 is a view in front elevation of an open safety belt embodying the invention.

As shown in FIG. 1, belt 10 is composed of an elongated member coated or made of reflective material, having end buckling or coupling means comprising VELCRO material 12 and/or an army type belt clasp 14 cooperative with holes 16 near the opposite end portions of the belt 10. A rear amber or red colored flashlight 18 is mounted on the belt near the middle thereof. A battery and on/off switch unit 20 is also mounted on the belt 10, and connected to the lamp 18 by insulated wires 22, hidden within the belt 10.

Secured by clips 23, 23 the belt 10 for location at the front of the wearer, is another lamp 24. The lamp 24 comprises an elongated rectangular housing 26 having two equal-sized compartments 28 and 30. The compartment 28 contains a dry cell battery 32 for energizing a lightbulb 34 having a reflector 36 in the other compartment 30.

Figure 2:
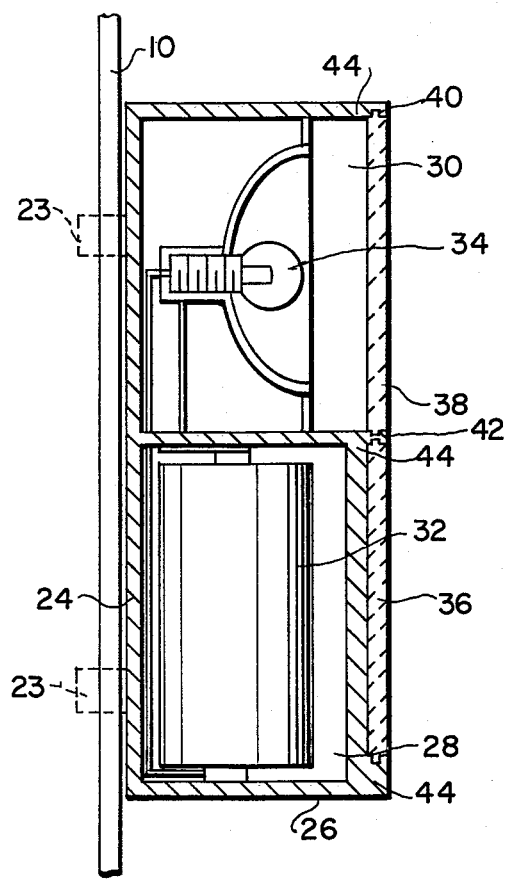
FIG. 2 is an enlarged view in horizontal cross-section of the front lamp taken on line 2—2 of FIG. 1.

A feature of the invention is the lamp/battery unit 24 that is readily removable by hand from the belt 10 for use as a portable flashlight by the wearer of belt 10. The compartments 28 and 30 are provided with square panes 36 and 38, FIG. 2, of different colors, such as red and clear reflective material. Such panes 36 and 38 have edge tongues 40 that snapfit corresponding grooves 42 in the square front frames 44 of the compartments 28 and 30. The connection is such that the panes 36 and 38 may be snapped out of frames 44, interchanged, and snapped back in such positions.

In use, the lamp 24 is located at the front of the wearer of belt 10 which is buckled at the right side of such wearer, with the lamp 18 at the back, and the switch/battery unit 20 for the latter, at the wearer's left side. The eyes of the wearer are protected from light from the front lamp 24 by virtue of the rectangular housing 26 and frame 38 arrangement which projects light forwardly of the belt wearer.

I claim:

1. A night light belt comprising:
    an elongated member composed of reflective material having quick-coupling means adjacent the opposite ends thereof,
    an elongated rectangular lamp-battery housing provided with clips for detachably engaging with said elongated member to hang the housing thereon, said housing normally hanging on said elongated member, said housing being divided into two separate side-by-side compartments in a plane parallel to said elongated member when hung thereon, one containing a battery for energizing a reflector lightbulb contained in the other, open compartment, said housing further having adjacent planar frames provided in the front of each of said compartments
    two panes composed of different colored reflective light transmissible material which snap-fit into said front frames of said compartments for interchange with each other,
    another lamp mounted at the rear of said elongated member when worn by a wearer, and
    a battery-switch unit mounted at the left side of said elongated member when so worn, for operating said lamp.

2. A night light belt as defined by claim 1, in which said lamp-battery housing constitutes a portable flashlight when removed from said elongated member.

3. A night light belt, as defined by claim 1, in which said quick-coupling means is selected from the group consisting of VELCRO material and army type belt clasp.

4. A night light belt according to claim 3 wherein said elongated member is a belt, said front frames are square and are provided with grooves, said panes are square and are provided with edge tongues which engage with said grooves such that said panes can be snap-fitted into said front frames, said lamp at the rear is a color selected from the group consisting of amber and red and said reflector lightbulb is recessed in said housing such that said housing prevents light from said reflector lightbulb from shining into eyes of a wearer of said belt.

* * * * *